Jan. 16, 1923.  1,442,400.
A. H. GREEN.
CALIBRATING WEIGHING TANKS.
FILED OCT. 3, 1921.

Witness:
J. C. Gellman

Inventor:
Andrew H. Green
By J. M. Roberts, Atty.

Patented Jan. 16, 1923.

1,442,400

UNITED STATES PATENT OFFICE.

ANDREW H. GREEN, OF CHICAGO, ILLINOIS, ASSIGNOR TO GREEN GAUGE COMPANY, OF CHICAGO, ILLINOIS, A CORPORATION OF ILLINOIS.

CALIBRATING WEIGHING TANKS.

Application filed October 3, 1921. Serial No. 505,088.

*To all whom it may concern:*

Be it known that I, ANDREW H. GREEN, a citizen of the United States, residing at Chicago, in the county of Cook, State of Illinois, having invented certain new and useful Improvements in Calibrating Weighing Tanks, do hereby declare that the following is a full, clear, and exact description of the same.

In certain classes of tanks it has been impossible to determine the pressure a given quantity of liquid will exert when placed in the tank. For example, in making glass-lined tanks in which an enamel is fused on the inside surface at high temperature, the process results in warping the tanks from their true cylindrical form, and it is therefore impossible to calculate the hydrostatic pressure in terms of the diameter as the sides are not uniform. The tanks are usually equipped with such accessories as agitators which displace a certain amount of liquid. For these reasons it is impossible to make a uniform scale for such tanks of the same size. Another type of tank is built with a slanting bottom, the tank proper being made in the shape of an elongated cube, and these tanks are usually equipped with coils which displace the liquid, thus making it impossible to determine the exact static pressure a given quantity of liquid will exert when placed in the tank.

The main object of my invention is to obviate these objections and difficulties so that all such variations are automatically taken care of and an exact liquid-weighing chart is obtained regardless of the size or shape of the tank and of any equipment inside it. My invention consists in a new and improved method of calibrating the tank, and also co-ordinating it with its gauge.

Figure 1:
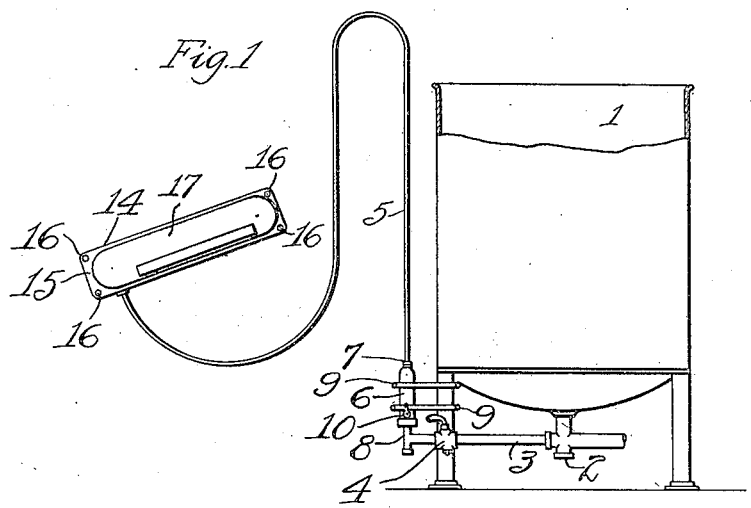
Figure 2:
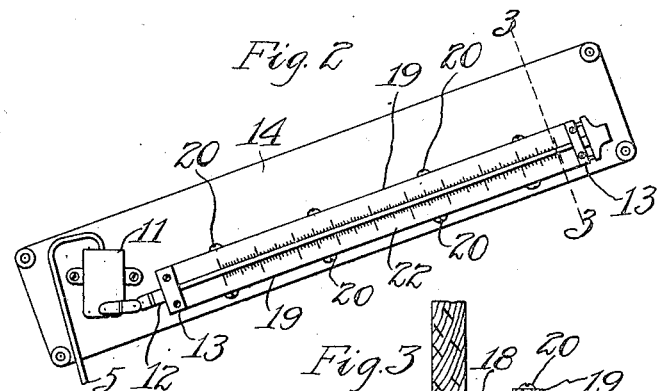
Figure 3:
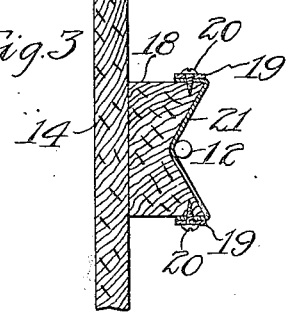

In the drawings which illustrate a device suitable for carrying out my invention, Fig. 1 is a view in elevation of a tank for weighing large quantities of liquid or semi-liquid material with calibrating apparatus including a pressure-operated recording gauge connected to it by a suitable pipe-line, Fig. 2 is a detail view of the gauge with the cover removed, and Fig. 3 is a cross sectional view on the line 3—3 in Fig. 2.

In the drawings the reference numeral 1 indicates a tank of suitable capacity to meet the requirements of any particular installation, having at the lowest point of its bottom a discharge pipe 2 provided with a lateral extension 3 in which a control cock or valve 4 is suitably mounted.

In practicing my invention a pressure-operated weight-indicating gauge is connected by a pipe-line to the pipe 3 beyond its control-cock 4, and this line is provided with an air-equalizing trap to ensure atmospheric pressure therein. In the apparatus shown this pipe-line is constituted by an air-pipe 5 and a trap 6 connected by an air-tight joint or fitting 7, the trap being somewhat larger in diameter than the pipe 5 and of sufficient length so that its top projects somewhat above the discharge opening of the tank when the bottom of the trap is connected to the upper end of the union 8 by which it is coupled to the outer end of the pipe 3. The trap is rigidly supported on the tank by brackets 9, and the pipe 5 is run to a point above the top of the tank and then is connected by an air-tight joint or fitting to the indicating gauge, which may be located at any suitable point. The trap is provided with an air-equalizer to provide atmospheric conditions in the pipe-line by venting or letting out excess air or gas impounded in the trap or line by the liquid sealing its lower end when the valve 4 is opened, or to equalize changes due to external atmospheric conditions; this ensures initial atmospheric pressure in the pipe-line and on the gauge so that it will always start at its zero reading or position when the liquid flows into the pipe-line and at any subsequent time an equal or uniform pressure will be obtained in the pipe-line for each weighing operation. In the exemplification shown, the air-equalizer is in the form of a pet-cock 10 in the trap, and preferably arranged with the base of its opening level with or tangential to the lowest point of the inside of the tank. The pet-cock may be placed higher in the trap, but it is preferred to locate it as above stated as then the liquid will not enter the trap above the pet-cock when the latter is opened for the purpose of equalizing the air in the line and will not enter the trap for any considerable distance above the cock when the latter is closed during the weighing operations, so that the liquid being weighed never touches the pipe 5 and the necessity of flushing or swabbing out any portion of this pipe to clean or sterilize it is obviated.

The gauge is of any suitable type, and in the form shown consists of a suitable mercury chamber 11 which is hermetically connected to the end of the pipe 5 and has a glass side arm or tube 12 which is open at its free end and is set at a suitable inclination to retain the movement of the mercury within its limits. The chamber and tube are mounted in brackets 13 in a casing 14 provided with a removable cover 15 held in place by screws 16 and having a glass panel 17 through which the interior parts may be observed. The casing is provided with a scale-holder in line with the tube 12 consisting of a trough-shaped or flared plate 18 secured to the casing and side-strips 19 attachable in predetermined position to the sides of the plate. The tube 12 extends along the depression in the plate but spaced away from it sufficiently to allow a scale-plate to be passed into position on the plate back of the tube, and the side-pieces are of approximately the same length as the tube and are constructed to be attached to the plate by screws 20 in definite and uniform relation in line with the tube. The holder always occupies the same position with relation to the tube, so that either a blank scale-sheet 21 or a finished scale-plate mounted in the holder in line with the tube will be in the same relation to the tube.

The procedure for calibrating the tank is carried out as follows:—The tank is empty, the control-cock 4 is closed and the pet-cock 10 is opened and the pipe system between the tank and the gauge is consequently full of air; a blank scale sheet 21 is placed in the holder in alinement with the tube 12, and then a carefully weighed unit of water, say 100 pounds for a small tank and 1000 pounds for a large tank, is run into the tank; the cock 4 is now cracked or opened enough to allow a small quantity of water to enter the trap until it starts to flow from the open pet-cock 10, when the cock 4 is closed; when the flow from the pet-cock ceases it is closed and the control-cock is opened; these checking-up operations bring the water in the trap to the level of the pet-cock and seal the lower end of the trap, and the weight of the water in the tank will compress the air in the pipe 5 and force the mercury to its weight-indicating point in the tube of the recording gauge, and this position of the end of the mercury column is then marked on the calibrating scale-sheet 21 by the operator; another equal unit of water is then introduced into the tank and this in turn forces the mercury in the tube to a higher point, which the operator also marks on the scale-sheet; this procedure is repeated until the maximum poundage desired is reached, the marks on the scale-sheet showing the readings for the successive calibrating units of water and indicating the definite points in the tube to which the mercury is forced by them. Enough units should be used to fill the tank at least half full as the more units that are weighed the more accurate the gauge will be. The establishment of atmospheric pressure or balance in the system is of importance as it obviates the effects of varying external temperatures or atmospheric conditions, variations in the temperature or properties of the liquid and other physical conditions that otherwise tend to cause discrepencies in the pressure in the pipe-line and unfavorably affect the readings; it ensures uniform pressure in the pipe-line and consequently uniform indications at the gauge. When the readings for the successive calibrating units have been thus indicated upon the calibrating sheet the latter is removed and used as a model or guide from which a corresponding permanent scale-plate 22 is made with all marks necessary to indicate weights of all amounts of liquid material in the tank from zero to the maximum of the calibrating scale. The permanent scale-plate is assembled in the holder on the gauge in corresponding place of the calibrating sheet with its respective markings at the exact points along the tube that the corresponding markings of the calibrating sheet before occupied; the water being drained from the tank and the control-valve opened and the pet-cock closed the apparatus is ready for checking-up and weighing liquid materials; with the scale-plate in position on the gauge in corresponding place of the calibrating sheet the tank and gauge are co-ordinated and no further calibrating is required as a uniform volume of air is always present in the air-line and each time the tank is emptied the mercury will return to its zero position, so that the process of filling the tank more or less with the liquid, weighing its contents and emptying it can be repeated indefinitely.

While I prefer to complete the scale of the calibrating marks for permanent use on a separate scale-plate it may be be done on the calibrating-sheet itself; in either case all suitable units and gradations are supplied.

I claim:

1. The method of calibrating liquid-weighing tanks with a mercurial weight-indicating gauge which consists in connecting them by a pipe-line, establishing atmospheric equilibrium therein, providing the gauge with a calibrating-sheet, passing into the tank successive batches of liquid material of equal known weight, marking the sheet to correspond with the position of the mercury in the gauge after each batch is run into the tank, and completing the scale of the calibrating marks for permanent use.

2. The method of calibrating liquid-weighing tanks with a mercurial weight-indicating gauge which consists in connecting them by a pipe line, establishing atmospheric equilibrium therein, providing the gauge with a removable calibrating sheet, passing into the tank successive batches of liquid of equal known weight, marking the sheet to correspond with the position of the mercury in the gauge after each batch is run into the tank, and reproducing the scale of the calibrating-marks on a permanent scale-plate.

3. The method of calibrating liquid-weighing tanks with a mercurial weight-indicating gauge which consists in connecting the gauge and tank by a pipe-line having an air-equalizing trap, providing the gauge with a removable calibrating-sheet, passing into the tank a batch of liquid of predetermined weight, operating the trap to admit some of the liquid thereto and establish atmospheric pressure in the pipe-line above such liquid, opening the trap to the pressure of the liquid in the tank, marking the sheet to correspond with the position of the mercury in the gauge, passing into the tank successive batches of the same liquid of equal weight with said first batch, marking the sheet to correspond with the successive positions of the mercury in the gauge, and reproducing the scale of the marks of the calibrating-sheet on a permanent scale-plate.

4. The method of calibrating tanks for weighing liquid materials and co-ordinating scale-plates therewith which consists in connecting a discharge outlet at the lowest point of a tank with a pressure-operated mercury gauge by a pipe-line having a valve-controlled air-equalizing trap, arranging a calibrating-sheet adjacent the gauge, passing into the tank a unit of a predetermined number of pounds of liquid material, cracking the control-valve to pass a portion of the material into the trap to seal the pipe-line, establishing atmospheric balance in the pipe-line, marking the calibrating-sheet at the end of the mercury column in the gauge, successively passing into the tank separate units of the same liquid of equal weight with said first unit, marking the calibrating-sheet at the end of the mercury column after each unit is passed in, reproducing the scale of the marks of the calibrating-sheet on a permanent scale-plate, and arranging the plate in the same relation to the gauge originally occupied by the calibrating-sheet.

In testimony whereof I affix my signature.

ANDREW H. GREEN.